United States Patent Office 3,562,101
Patented Feb. 9, 1971

3,562,101
BORON NITRIDE FILLED PAPER
Joseph W. Tereshko, Berea, Ohio, assignor to Union Carbide Corporation, New York, N.Y., a corporation of New York
No Drawing. Continuation-in-part of application Ser. No. 583,093, Sept. 29, 1966. This application Feb. 19, 1969, Ser. No. 800,722
Int. Cl. D21h 3/00
U.S. Cl. 162—138                        5 Claims

ABSTRACT OF THE DISCLOSURE

A thin solution of a resin dissolved in a suitable solvent, for example toluene, said resin selected from the group consisting of polyvinyl chloride epoxy and phenolic resins, is mixed with boron nitride particles. The mixture is heated to drive off the solvent and cure the resin. The resultant boron nitride particles coated with resin are pulverized to a very small particle size, mixed with water and added to the aqueous pulp slurry to produce a paper of enhanced thermal conductivity containing moisture resistant particles.

---

This application is a continuation in part of Ser. No. 583,093 filed Sept. 29, 1966 and now abandoned.

This invention relates to the improvement of heat transfer characteristics of dielectric materials and, more particularly, to boron nitride filled paper and to the method of producing the paper.

Various dielectric materials are employed as electrical insulators in such apparatus as transformers, capacitors, coils, motors, and the like. The conventional materials which are employed as dielectrics in a solid form are relatively poor heat conductors and are subject to breakdown, if they are heated above the decomposition temperature. Solid insulators, such as paper, will decompose or char if they are overheated.

To avoid these adverse effects it is imperative that the heat which is generated within the electrical apparatus due to the power loss be kept at a minimum, or that the dielectric material be capable of conducting heat effectively. Reducing the power loss heat dissipation is generally an unsatisfactory solution, since to accomplish this, input and output power to the equipment must also be reduced thereby reducing the effectiveness of the equipment. Restricting the power rating of the equipment is, in addition, of substantial economic significance particularly with regard to large equipment having a large power capacity such as transformers, motors and the like.

In an effort to overcome these defects, several methods to improve heat transfer through the dielectric are used. For example, fluid dielectrics are often circulated by auxiliary equipment in an effort to cool the fluid. Other electrical apparatus depends primarily upon natural convection for an increase in heat dissipation. Many other types of cooling equipment are also used. However, the methods presently employed are generally expensive or relatively ineffective.

Due to its high dielectric strength, paper is often employed as an electrical insulator in the manufacture of various types of equipment. However, since paper is a poor thermal conductor, its use is generally limited to those applications where heat dissipation is not a problem.

It is the principal object of this invention, therefore, to provide a novel paper which is characterized by both a high dielectric strength and a high degree of thermal conductivity.

It is another object of this invention to provide a method for producing sheet paper containing boron nitride particles whereby the thermal conductivity of the dielectric paper is greatly improved.

Broadly, the objects of this invention are accomplished by incorporating boron nitride into paper such that the paper's thermal conductivity is increased while its excellent dielectric properties are maintained. The process of the invention comprises preparing an aqueous slurry of cellulosic pulp from water and fibers which are formed by fibrillating wood, rags, plant fibers, and the like, then dispersing boron nitride particles substantially uniformly throughout the cellulosic pulp slurry and depositing the pulp and the particles which have been homogenously intermixed on a substrate to form a paper mat and processing the mat through a conventional paper making process to produce boron nitride filled paper.

The aqueous pulp slurry may be produced in the conventional manner which is often employed in the production of paper. Various fibers and admixtures of fibers may be employed to prepare the slurry, such fibers including both synthetic and natural cellulosic fibers such as Manila hemp, jute, bleached or unbleached kraft, caroa, sisal, kozu, viscose and acetate rayon, and the like.

Converting the fiber slurry into the paper sheet involves three general steps, or modifications of these, by which all commercial-base papers are made:

(1) The random arrangement of the fibers in the slurry into a wet web;

(2) The removal of a portion of the free water from the wet web by wet pressing—this is reflected by improved physical characteristics of the paper;

(3) The progessive removal of additional water by heat. In principle, a wet sheet is generally formed either by running a dilute suspension of fibers evenly onto the surface of a moving endless belt of wire cloth, through which excess water may be drained, or by running an endless belt of wire cloth through a suspension of fibers. In the first case—the Fourdrinier process—a part of the water drains off by gravity, a part is taken from the sheet by suction, and a part is removed by pressure; in the second case, a vacuum is maintained below the stock level in the cylinder in which the wire cloth is rotating and the sheet forms on the wire by suction much as does a cake on a vacuum filter. Most paper grades are formed by the first process; vary light-weight tissues and many grades of paperboard are made by the second. In either case, the thickness of the sheet is controlled by the speed of travel of the machine, by the consistency (ratio of fiber to water) of the suspension, or by the amount of stock allowed to flow onto the machine.

For a more detailed descriptoin of paper making processes, reference should be made to "Encyclopedia of Chemical Technology," by R. Kirk and D. Othmer, vol. 9, pp. 812–842 and to the bibliography appended thereto.

It has been discovered that if, prior to processing the pulp slurry as above-described, the pulp slurry is admixed with a slurry containing boron nitride and water, a boron nitride filled paper is produced exhibiting excellent dielectric and thermal conductivity properties.

In addition to its electrically insulating properties and its favorable thermal conductivity and diffusivity characteristics, boron nitride is inert and will not decompose at the high temperatures which are produced in electrical equipment. Boron nitride may be produced by any one of a number of conventional well known processes. For example, it may be prepared by reacting melamine with boric acid and then heating the resultant product in an ammonia atmosphere at a temperature of about 950° C.

The quantity of boron nitride which is present in the paper of the invention may vary from 10 percent or less to 80 percent by weight of the paper. The greater the quantity of boron nitride, the greater will be the thermal conductivity of the paper. However, practical considerations, such as the adverse effect on the strength of the paper, cause it to be preferable to produce a product having between 25 percent and 65 percent boron nitride by weight of paper. These preferable ratios may be obtained by employing a quantity of boron nitride particles weighing about 50 to 300 percent by weight of the pulp slurry to form the boron nitride slurry.

Of course, boron nitride filled paper laminates may be produced in the same manner as conventional paper laminates are produced.

The following is a typical example of the production of paper having boron nitride contained therein:

A pulp fiber furnish was prepared by refining 100 percent unbleached softwood kraft to a Canadian Standard Freeness of 300. Fifty pounds of this pulp furnish was diluted with water to give a stock consistency (percent solids) of approximately 1.5. In a separate container, a slurry of filler material was prepared by adding boron nitride powder to water which contained methanol as a wetting agent. The particle size of boron nitride used was in the 0.2 micron to 1.0 micron range. In order to assure good wetting and a uniform dispersion of the boron nitride powder in the water, a high speed stirrer was employed to vigorously agitate the water while the boron nitride was being added thereto. Tap water was used as the diluent throughout the experiment with no pH adjustment. The so-treated pulp fiber furnish and filler material were then mixed together and continuously stirred for about thirty minutes. Water was added to the resultant homogenous mixture to adjust its consistency to the degree required for processing it on the paper making machine. Boron nitride containing paper was then produced by processing the foregoing boron nitride-pulp fiber furnished on a laboratory size Fourdrinier paper making machine.

A number of tests were carried out on a series of boron nitride filled paper which was produced by employing the process described in the above example. The following table illustrates the properties of the papers which were produced.

Resin VYHH manufactured and commercially available from Union Carbide Corporation. These resins are neutral, non-oxidizing, non-heat reactive, have a low water vapor permeability and low water absorption capability. This latter characteristic is of course most desirable for any resin which is employed.

Thermosetting resins such as epoxies and phenolics may also be used to coat the boron nitride particles. Suitable epoxies are epichlorohydrin-Bisphenol A and its copolymer. Phenolics are more difficult to apply to the particles and so phenolic varnishes are preferable resins to employ.

The resin is normally dissolved in a suitable solvent to obtain a thin solution, and boron nitride powder is mixed in the solution to obtain a thick slurry. The mixing may be carried out in a paddle blade or bread mixer. The mix is then heated to evaporate the solvent and/or cure the resin. The resultant mass is pulverized to obtain the desired particle size for addition to the aqueous pulp slurry. As an example of this procedure, the aforementioned VYHH resin was dissolved in equal amounts of methyl ethyl ketone and toluene. The boron nitride particles were then added to the solution. Additional solvent of the same proportions was added as needed to maintain the heavy slurry consistency. After all of the boron nitride was homogenously mixed, the solvent was allowed to evaporate until cracking occurred. Then the mixture was cured at 120° C. for two hours using a 30° C. per hour rate of temperature rise. After curing, the resin coated material was reduced to a powder. The resin amounted to about 2 percent by weight of the powder.

In order to test the effectiveness of this type of coating, boron nitride having the resin coating applied was placed in an atmosphere having a 90 percent humidity. Analysis after a testing period of 8 hours showed that the coated boron nitride had a water content of 1 milligram of water per gram of boron nitride, whereas the water pickup of uncoated boron nitride was six times greater.

In addition to the aforementioned moisture resistant coating procedure, the boron nitride filled paper of the invention may be coated with boron nitride. The boron nitride coating serves to supplement any small voids which

PROPERTIES OF BORON NITRIDE FILLED PAPER

| Percent wood pulp | Percent BN | Percent BN in paper | Tensile force, lbs. | Weight of 8 x 8" sheet, g. approximate | Average thickness per sheet, cm. | Thermal conductivity, cal./cm. sec./°C. |
|---|---|---|---|---|---|---|
| 100 | 0 | 0 | 15.88 | 2.5 | .104 | $1.20 \times 10^{-4}$ |
| 80 | 20 | 5.2 | 11.95 | 2.5 | .108 | $1.28 \times 10^{-4}$ |
| 75 | 25 | 9.1 | 9.37 | 2.5 | .108 | $1.31 \times 10^{-4}$ |
| 50 | 50 | 24.7 | 4.75 | 2.5 | .094 | $1.43 \times 10^{-4}$ |
| 40 | 60 | 39.2 | 1.66 | 2.5 | .122 | $1.60 \times 10^{-4}$ |
| 33 | 67 | 56.8 | 1.65 | 7.5 | .212 | $2.64 \times 10^{-4}$ |
| 25 | 75 | 62.5 | 3.94 | 5.0 | .227 | $2.33 \times 10^{-4}$ |

As indicated in the table, the thermal conductivity of the boron nitride filled paper increased as much as 100 percent over the thermal conductivity of the paper having no boron nitride therein. It is to be further noted that the dielectric properties of the paper were so adversely affected although this data is not presented in the table.

For most effective and efficient results when combining the dielectric paper and the boron nitride, the latter should be in a powder form having a particle size of from 0.01 micron to 44 microns. Larger particles are difficult to disperse during processing and the boron nitride is not generally dispersed well in the final product.

As commercially produced, boron nitride is often adversely affected by moisture. To further enhance the properties of the boron nitride filled paper, the boron nitride particles may be coated with a resin material before being joined with the aqueous pulp slurry. Suitable resins are thermoplastic resins such as polyvinyl chlorides and acetates. A typical resin of this type is Bakelite (registered trademark of Union Carbide Corporation). Vinyl solution occur due to the paper not being completely filled with boron nitride during processing. Furthermore, the coating insures a complete paper to paper contact when the boron nitride paper is overlapped during assembly.

What is claimed is:

1. A paper dielectric material for use in electrical equipment having boron nitride incorporated therein, said boron nitride having a particle size of 0.01–44 microns and being incorporated in an amount sufficient to increase the thermal conductivity of said paper material and being coated with a moisture resistant resin prior to incorporation therein, said resin being selected from the group consisting of polyvinyl chloride, epoxy and phenolic resins.

2. The material of claim 1 wherein the amount of said boron nitride is from about 10 percent to about 80 percent by weight of said paper.

3. The material of claim 1 wherein the amount of said boron nitride is from about 25 percent to about 65 percent by weight of said paper.

4. The material of claim 1 wherein said resin comprises about 2 percent by weight of said boron nitride.

5. In a process for producing paper which includes preparing an aqueous slurry of cellulosic pulp by admixing water and a fiber furnish, the improvement which comprises preparing a thin solution of a resin dissolved in a suitable solvent, said resin being selected from the group consisting of polyvinyl chloride, epoxy and phenolic resins, mixing boron nitride particles in said solution to obtain a slurry, heating said slurry to evaporate said solvent and cure said resin, pulverizing the cured mixture to finely divided particles having a particle size of 0.01–44 microns, preparing a second slurry of said particles and water, intermixing said cellulosic pulp slurry and said second slurry until a substantially homogenous mixture is achieved, and forming a paper therefrom.

References Cited
UNITED STATES PATENTS

| | | | |
|---|---|---|---|
| 2,152,536 | 3/1939 | Cooper | 162—181 |
| 3,224,993 | 12/1965 | Wynne | 117—100I |
| 3,375,123 | 3/1968 | Krocker | 106—308 |
| 3,458,395 | 6/1969 | Stalker | 162—181 |

S. LEON BASHORE, Primary Examiner

R. H. ANDERSON, Assistant Examiner

U.S. Cl. X.R.

106—308; 117—100; 162—181